United States Patent
Osterheld et al.

(10) Patent No.: US 11,571,786 B2
(45) Date of Patent: Feb. 7, 2023

(54) CONSUMABLE PART MONITORING IN CHEMICAL MECHANICAL POLISHER

(71) Applicant: Applied Materials, Inc., Santa Clara, CA (US)

(72) Inventors: Thomas H. Osterheld, Mountain View, CA (US); Dominic J. Benvegnu, La Honda, CA (US)

(73) Assignee: Applied Materials, Inc., Santa Clara, CA (US)

( * ) Notice: Subject to any disclaimer, the term of this patent is extended or adjusted under 35 U.S.C. 154(b) by 885 days.

(21) Appl. No.: 16/294,486

(22) Filed: Mar. 6, 2019

(65) Prior Publication Data
US 2019/0283209 A1    Sep. 19, 2019

Related U.S. Application Data

(60) Provisional application No. 62/642,450, filed on Mar. 13, 2018.

(51) Int. Cl.
*B24B 49/12* (2006.01)
*B24B 37/013* (2012.01)
(Continued)

(52) U.S. Cl.
CPC ............ *B24B 49/12* (2013.01); *B24B 37/013* (2013.01); *B24B 37/04* (2013.01); *B24B 53/017* (2013.01); *G06N 3/084* (2013.01)

(58) Field of Classification Search
CPC ..... B24B 49/12; B24B 49/186; B24B 37/013; B24B 37/04; B24B 37/005; B24B 37/042;
(Continued)

(56) References Cited

U.S. PATENT DOCUMENTS 6,210,255 B1    4/2001 Zuniga et al.
6,390,908 B1 *  5/2002 Chen ....................... B24B 49/12
                                              451/41
(Continued)

FOREIGN PATENT DOCUMENTS

CN    101422867    5/2009
CN    102725830    10/2012
(Continued)

OTHER PUBLICATIONS

Office Action in Chinese Appln. No. 201980024571.X, dated Feb. 7, 2022, 17 pages (with English translation).
(Continued)

*Primary Examiner* — Joel D Crandall
*Assistant Examiner* — Michael A Gump
(74) *Attorney, Agent, or Firm* — Fish & Richardson P.C.

(57) ABSTRACT

A polishing apparatus includes a polishing station to hold a polishing pad, a carrier head to hold a substrate in contact with a polishing pad at the polishing station, a camera positioned to capture an image of a lower surface of a consumable part when the consumable part moves away from the polishing pad, and a controller configured to perform an image processing algorithm on the image to determine whether the consumable part is damaged. The consumable part can be a retaining ring on a carrier head, or a conditioner disk on a conditioner head.

10 Claims, 1 Drawing Sheet

(51) Int. Cl.
*G06N 3/08* (2006.01)
*B24B 53/017* (2012.01)
*B24B 37/04* (2012.01)

(58) Field of Classification Search
CPC ..... B24B 37/0053; B24B 37/20; B24B 37/32; B24B 37/10; B24B 37/107; B24B 37/27; B24B 37/30; B24B 37/34; B24B 53/017; B24B 27/0069; B24B 7/228; G06N 3/084; G06N 3/0454; G06T 2207/20084; G06T 2207/30148; G06T 7/0004
USPC ............................................................. 451/6
See application file for complete search history.

(56) References Cited

U.S. PATENT DOCUMENTS

| | | | |
|---|---|---|---|
| 6,923,709 B2* | 8/2005 | Chen | B24B 37/32 |
| | | | 451/6 |
| 9,017,138 B2 | 4/2015 | Chen et al. | |
| 9,067,295 B2 | 6/2015 | Deshpande et al. | |
| 10,360,477 B2* | 7/2019 | Bhaskar | G06T 7/0004 |
| 11,228,709 B2* | 1/2022 | Athreya | H04N 5/247 |
| 2004/0152396 A1 | 8/2004 | Wiswesser et al. | |
| 2006/0270322 A1 | 11/2006 | Yilmaz et al. | |
| 2007/0099545 A1* | 5/2007 | Mavliev | B24B 37/34 |
| | | | 451/41 |
| 2010/0029178 A1 | 2/2010 | Yilmaz et al. | |
| 2012/0021671 A1* | 1/2012 | McReynolds | B24B 37/005 |
| | | | 451/6 |
| 2013/0203321 A1* | 8/2013 | Chen | B24B 37/345 |
| | | | 451/5 |
| 2015/0133038 A1* | 5/2015 | Yamaki | B24B 37/32 |
| | | | 451/287 |
| 2015/0273650 A1* | 10/2015 | Namiki | B24B 37/015 |
| | | | 451/5 |
| 2016/0229026 A1* | 8/2016 | Kawasaki | B24B 37/32 |
| 2017/0200260 A1 | 7/2017 | Bhaskar et al. | |

FOREIGN PATENT DOCUMENTS

| | | |
|---|---|---|
| CN | 103084969 | 5/2013 |
| EP | 0885691 | 12/1998 |
| JP | H 1-284413 | 11/1989 |
| JP | 2005-340718 | 12/2005 |
| JP | 2006-035353 | 2/2006 |
| JP | 2008-543047 | 11/2008 |
| JP | 2013-532588 | 8/2013 |
| JP | 2015-188955 | 11/2015 |
| JP | 2019-502256 | 1/2019 |
| KR | 10-2013-0102699 | 9/2013 |
| TW | 1320732 | 2/2010 |
| TW | 1602644 | 10/2017 |
| WO | WO 2017/146719 | 8/2017 |

OTHER PUBLICATIONS

Office Action in European Appln. No. 19766872.6, dated Nov. 10, 2021, 6 pages.
PCT International Search Report and Written Opinion in International Appln. No. PCT/US2019/021044, dated Jun. 24, 2019, 11 pages.
Office Action in Japanese Appln. No. 2020-548664, dated Oct. 26, 2022, 7 pages (with English translation).
Office Action in Taiwanese Appln. No. 108108157, dated Nov. 29, 2022, 19 pages (with English summary and search report).

* cited by examiner

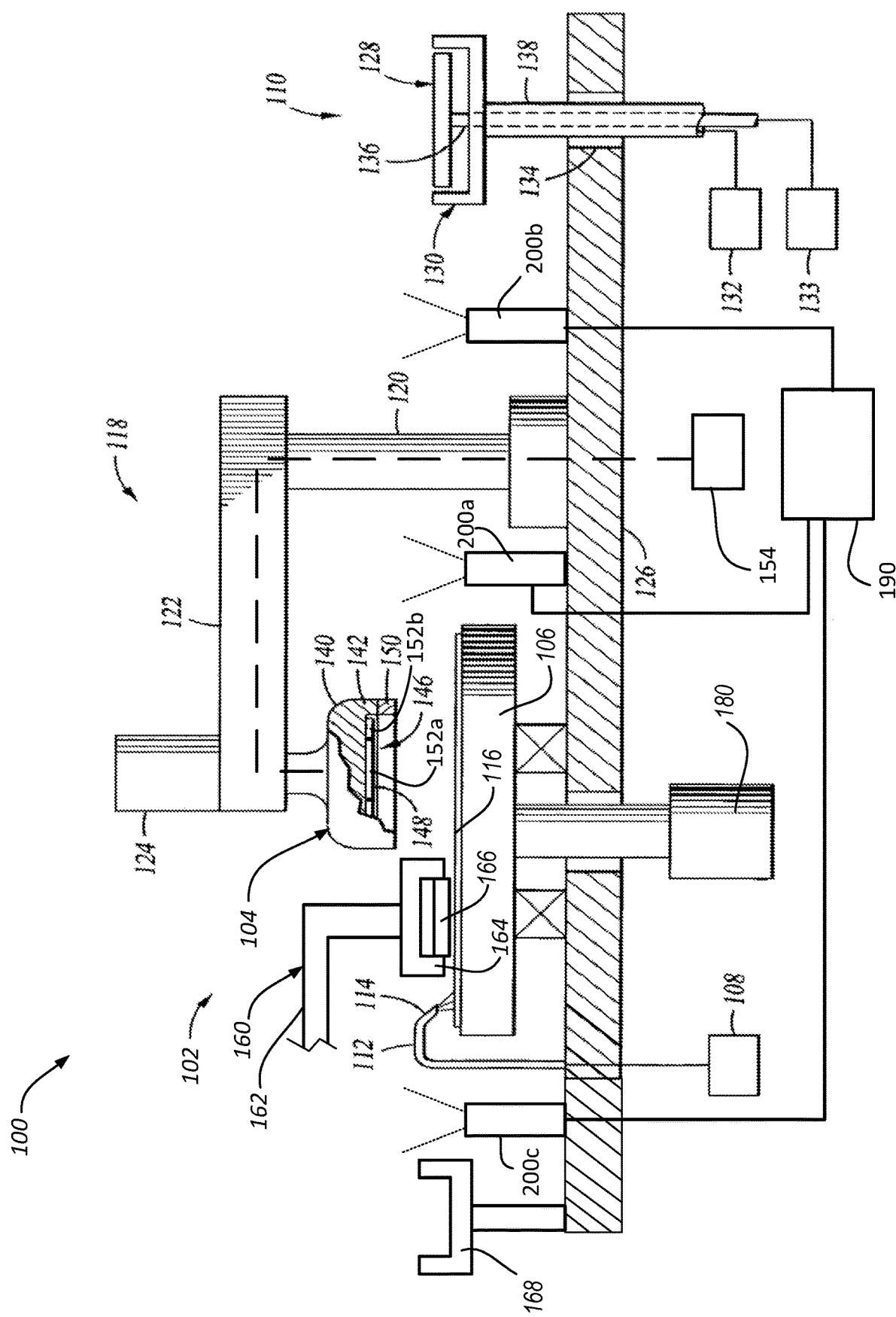

CONSUMABLE PART MONITORING IN CHEMICAL MECHANICAL POLISHER

CROSS-REFERENCE TO RELATED APPLICATIONS

This application claims priority to U.S. Provisional Application Ser. No. 62/642,450, filed on Mar. 13, 2018, the entire disclosure of which is incorporated by reference.

TECHNICAL FIELD

This disclosure relates to monitoring of a consumable part, e.g., a retaining ring and/or conditioning disk, in a chemical mechanical polishing system.

BACKGROUND

Chemical mechanical polishing (CMP) is one of many processes used in the fabrication of high density integrated circuits. Chemical mechanical polishing is generally performed by moving a substrate against a polishing material in the presence of a polishing fluid. In many polishing applications, the polishing fluid contains an abrasive slurry to assist in the planarization of the feature side of the substrate that is pressed against the polishing material during processing.

The substrate is generally retained during polishing operations by a carrier head. Conventional carrier heads include a retaining ring that bounds a substrate retaining pocket. The substrate may be held in the substrate retaining pocket by stiction to a flexible membrane. The retaining ring prevents the substrate from slipping out from under the polishing head during polishing.

During polishing, the retaining ring is typically pressed against the polishing pad. A pressurizable chamber in the carrier head can control the vertical position of the retaining ring. The retaining ring is typically formed of a wearable material, and as polishing progresses, the bottom surface of the retaining ring is worn away. Consequently, the thickness of the retaining ring can change over the course of processing multiple substrates. Eventually the retaining ring may need to be replaced.

In addition, after the CMP process is performed for a certain period of time, the surface of the polishing pad can become glazed due to accumulation of slurry by-products and/or material removed from the substrate and/or the polishing pad. Glazing can reduce the polishing rate or increase non-uniformity on the substrate.

Typically, the polishing pad is maintained in with a desired surface roughness (and glazing is avoided) by a process of conditioning with a pad conditioner. The pad conditioner is used to remove the unwanted accumulations on the polishing pad and regenerate the surface of the polishing pad to a desirable asperity. Typical pad conditioners include an abrasive disk generally embedded with diamond abrasives which can be scraped against the polishing pad surface to retexture the pad. However, the conditioning process also tends to wear the conditioner disk itself. Consequently, after a certain number of cycles of polishing and conditioning, the conditioner disk may need to be replaced.

SUMMARY

A polishing apparatus includes a polishing station to hold a polishing pad, a carrier head to hold a substrate in contact with a polishing pad at the polishing station, a camera positioned to capture an image of a lower surface of a consumable part when the consumable part moves away from the polishing pad, and a controller configured to perform an image processing algorithm on the image to determine whether the consumable part is damaged. The consumable part can be a retaining ring on a carrier head, or a conditioner disk on a conditioner head.

Advantages of implementations can include one or more of the following. Consumable parts, e.g., the retaining ring and/or conditioning disk, of a chemical mechanical polishing system may be replaced before damage to such parts impact the polishing process. This can reduce scratches and defects, and improve polishing uniformity.

BRIEF DESCRIPTION OF THE DRAWINGS

FIG. 1 is a simplified side view, partially in section, of an implementation of a chemical mechanical polishing system.

DETAILED DESCRIPTION

In addition to general wear (e.g., thickness reduction) of consumable parts such as the retaining ring or conditioning disk, it is also possible for such consumable parts to be damaged in a manner that does not particularly change their thickness. For example, the inner surface of a retaining ring can be notched or cracked, which can introduce polishing non-uniformity. Similarly, abrasive particles on the conditioning disk can come loose, which can introduce non-uniformity into the conditioning process.

However, by placing a camera in the polishing system in a position to periodically scan the consumable part, it is possible to capture an image of the consumable part. This image can then be subject to image analysis software, e.g., an algorithm trained by a machine learning technique, to identify a damaged consumable part.

FIG. 1 depicts a partially sectional view of a simplified chemical mechanical polishing system 100 that includes a polishing station 102, a carrier head 104 and a substrate transfer station. In some implementations, the substrate transfer station is a load cup 110. The various components can be supported on a base 126. Examples of suitable polishing systems which may be adapted to benefit from the invention include MIRRA™ and REFLEXION™ chemical mechanical polishing systems available from Applied Materials.

In one implementation, the polishing station 102 includes a rotatable platen 106 having a polishing pad 116 disposed thereon. The platen 106 is operable to rotate about an axis. For example, a motor 180 can turn a drive shaft to rotate the platen 106.

The polishing pad 116 may be a conventional polyurethane polishing pad, a fixed abrasive material, or another pad suitable for chemical mechanical polishing. The polishing pad 116 can be a two-layer polishing pad with an outer polishing layer and a softer backing layer.

The polishing station 102 additionally includes a polishing liquid source 108 adapted to provide a polishing liquid to the working surface of the polishing pad 116 during processing. In the embodiment depicted in FIG. 1, an arm 112 having at least one nozzle 114 is positioned to flow polishing fluid onto the polishing material 116 during processing. The polishing liquid can include abrasive particles, e.g., the polishing liquid can be a polishing slurry.

The polishing station 102 can also include a polishing pad conditioner 160 to abrade the polishing pad 116 to maintain the polishing pad 116 in a consistent abrasive state. The polishing pad conditioner 160 includes a conditioner base, an arm 162 that can sweep laterally over the polishing pad 116, and a conditioner head 164 connected to the base by the arm 162. The conditioner base can be supported on the polishing system machine base 126. The conditioner head 164 brings an abrasive surface, e.g., a lower surface of a disk 166 held by the conditioner head 164, into contact with the polishing pad 116 to condition it. The abrasive surface can be rotatable, and the pressure of the abrasive surface against the polishing pad can be controllable.

In some implementations, the arm 162 is pivotally attached to the conditioner base and sweeps back and forth to move the conditioner head 164 in an oscillatory sweeping motion across the polishing pad 116. The motion of the conditioner head 164 can be synchronized with the motion of carrier head 104 to prevent collision. Vertical motion of the conditioner head 164 and control of the pressure of conditioning surface on the polishing pad 116 can be provided by a vertical actuator above or in the conditioner head 164, e.g., a pressurizable chamber positioned to apply downward pressure to the conditioner head 164, or by a vertical actuator in the base that lifts the entire arm 162 and conditioner head 164, or by a pivot connection between the arm 162 and the base that permits a controllable angle of inclination of the arm 162 and thus height of the conditioner head 164 above the polishing pad 116.

The polishing station 102 can also include a conditioner rinse cup 168 positioned to the side of the platen 106. After a polishing operation, the arm 162 can swing around to place the conditioner head 164, including the conditioner disk 166, into the rinse cup 168. The rinse cup 168 can include nozzles configured to spray the head 164 and disk 166 with a cleaning fluid, e.g., deionized water, to rinse off any debris, particulates or contamination.

The carrier head 104 is suspended from a support structure 118, e.g., a carousel or a track, which can act as a transfer mechanism, that is coupled to the base 126. The transfer mechanism is generally adapted to position the carrier head 104 selectively between a processing position over the polishing pad 116 and a transfer position over the load cup 110. The carrier head 104 can be connected by a drive shaft to a carrier head drive mechanism 124, e.g., a rotary motor, so that the carrier head 104 can rotate.

In operation, the platen is rotated about its central axis, and the carrier head 104 is rotated about its central axis and translated laterally across the top surface of the polishing pad 116. Optionally, during polishing, the carrier head 104 can oscillate laterally, e.g., on sliders on the carousel or track; or by rotational oscillation of the carousel itself.

In the implementation depicted in FIG. 1, the transfer mechanism 118 includes a stanchion 120 having a cantilevered arm 122 that may be rotated to laterally position the carrier head 104. The carrier head 104 can be coupled to the arm 122 by the motor 124. The elevation of the polishing head 104 relative to the base 126 can be controlled by the drive mechanism 124 or by a pressurizable chamber inside the carrier head 104.

Generally, the polishing head 104 comprises a housing 140 and a retaining ring 150 secured near an edge of the housing, e.g., to a rim 142, to retain the substrate within a recess 146 in the polishing head 104 during polishing. In some implementations, the carrier head 104 includes a flexible membrane 148, behind which are a plurality of independently pressurizable chambers, which can apply different pressures to different radial zones of the substrate. For example, the carrier head can include a first chamber 152a to apply pressure to a central portion of the substrate and a second chamber 152b to apply pressure to an edge portion of the substrate. The chambers 152a, 152b are coupled to pressure sources 154 (only one is shown in FIG. 1 for simplicity) such that the chambers 152a, 152b can be independently controllably inflated or deflated.

In order to perform a transfer operation, the flexible membrane 148 can be brought in contact with the substrate, and one or more the chambers 152a, 152b can be deflated, thus creating a vacuum between the substrate and the flexible membrane and thereby securing the substrate on the carrier head 104. In order to perform a polishing operation, one or more the chambers 152a, 152b can be inflated, thus pressing the substrate against the polishing pad 115.

The vertical position of the retaining ring 150, and the pressure of the retaining ring 150 against the polishing pad 116, can also be adjustable, e.g., by the drive mechanism 124 or by another pressurizable chamber inside the carrier head 104. Pressure in the pressurizable chamber inside the carrier head 104 that controls the vertical position of the retaining ring 150 can be controlled by the pressure source 154.

The load cup 110 generally includes a pedestal assembly 128 and a cup 130. The pedestal assembly 128 provides a structure that mates with the polishing head 104 to insure alignment therebetween during substrate transfer. The pedestal assembly 128 is generally extended to transfer the substrate to the polishing head 104 and retracts from the extended position to receive the substrate during the process of de-chucking.

A controller 190, e.g., a programmed computer including a microprocessor, is configured to control the various components of the polishing system 100. For example, the controller 190 can be coupled to the motors 124, 180 to control the rotational speeds of the carrier head 104 and platen 106 respectively, to pressure source 164 to control the pressure in the carrier head 104, to an actuator that controls the positioning of the transfer device 118, to actuators 132, 133 to control operation of the load cup 110, to actuators in the conditioner system 160 to control the position of the conditioner head 164 and down-force of the conditioner disk 166 on the polishing pad 116, to the polishing liquid supply 108 to control the flow rate of the polishing liquid onto the polishing pad, and/or to the conditioner rinse disk 168 to control operation of nozzles to spray cleaning fluid on the conditioner head 164.

Although the controller 190 is illustrated as a single part, the controller 190 can be a distributed across multiple processing components connected a computer network.

As noted above, it is possible for consumable parts, e.g., the retaining ring 150 and/or the conditioner disk 166, to be damaged or overly worn. The polishing system 100 also includes a consumable part monitoring system to detect whether the consumable parts are damaged.

In particular, the polishing system 100 includes one or more cameras 200 positioned to capture an image of the underside of a consumable part. Each camera can be positioned in a spot in a path where the consumable part is be carried. For example, a camera to monitor the retaining ring can be positioned on a path that the carrier head travels between the platen 106 and the load cup 110. Similarly, a camera to monitor the conditioner disk can be positioned on a path that the conditioner head travels between the platen 106 and the rinse cup 168. Each camera can have a field of view (indicated by the broken lines) through which the consumable part travels.

As one example, a camera 200a can be positioned on the base 126 adjacent the platen 106. This camera 200a can capture of an image of the underside of the retaining ring 150 as the carrier head 104 moves from the polishing station 102 to the load cup 110, or vice versa.

As another example, a camera 200b can be positioned on the base 126 adjacent the load cup 110. This camera 200b can capture of an image of the underside of the retaining ring 150 as the carrier head 104 moves from the polishing station 102 to the load cup 110, or vice versa.

As another example, a camera 200c can be positioned on the base 126 adjacent the rinse cup 168. This camera 200c can capture of an image of the underside of the conditioner disk 166 as the conditioner head 164 moves from the polishing station 102 to the rinse cup 168, or vice versa.

In some implementations, the field of view is sufficiently wide that the entire underside of the consumable part can be captured in a single image. In some implementations, the field of view does not cover the entire underside of the consumable part, and multiple images are taken by the camera as the consumable part moves through the field of view; the multiple images include the entire underside of the part. Optionally, these multiple images can be stitched together to form a single image that covers the entire underside of the consumable part. This image stitching can be performed using known image processing techniques.

The image from the camera 200 is subject to an image processing algorithm run by software in the controller 190 to determine whether there is damage to the consumable part. For example, the image processing program can be configured to detect cracks or chips in an inner edge of the lower surface of the retaining ring 150 from the image. As another example, the image processing program can be configured to detect stains, scratches or unusual surface texture on the lower surface of the retaining ring 150 from the image. As another example, the image processing program can be configured to detect missing abrasive particles, or patterns of wear or stains, in the lower surface of the conditioner disk 166 from the image.

In some implementations, if the controller 190 detects a damaged consumable part, it can signal an operator that replacement is needed. Alternatively, if the controller 190 detects a damaged consumable part, it may be able to adjust an operating parameter of another component in the polishing system to compensate for non-uniformity introduced by the damage.

In some implementations, the image processing algorithm can be generated by training a machine learning system. For example, the machine learning system can be trained with images of normal and "defective" consumable parts. The image processing algorithm can be implemented as a generic neural network. For example, the neural network can be a convolutional neural network or a fully connected neural network. The training can be performed by operating in a backpropagation mode.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The present invention has been described in terms of a number of embodiments. The invention, however, is not limited to the embodiments depicted and described. Rather, the scope of the invention is defined by the appended claims.

What is claimed is:

1. A polishing apparatus, comprising:
   a polishing station;
   a carrier head to hold a substrate in contact with a polishing pad at the polishing station, the carrier head including a retaining ring;
   a camera positioned to capture an image of a lower surface of the retaining ring when the carrier head moves away from the polishing pad; and
   a controller configured to perform an image processing algorithm on the image to determine whether the lower surface of the retaining ring is damaged, wherein damage comprises one or more of i) cracks, ii) chips, iii) stains, and iv) scratches.

2. The polishing apparatus of claim 1, wherein the image processing algorithm comprises a trained machine learning algorithm.

3. The polishing apparatus of claim 1, comprising a substrate transfer station to load and/or unload the substrate from the carrier head, wherein the carrier head is movable between the polishing station and the transfer station.

4. The polishing apparatus of claim 3, wherein the camera is positioned to capture the image of the lower surface of the retaining ring as the carrier head moves between the polishing station and the transfer station.

5. The polishing apparatus of claim 3, wherein the camera is positioned adjacent a platen in the polishing station.

6. The polishing apparatus of claim 3, wherein the camera is positioned adjacent the substrate transfer station.

7. The polishing apparatus of claim 1, wherein the camera is configured to take multiple images of the lower surface of the retaining ring as the carrier head moves.

8. The polishing apparatus of claim 7, wherein the controller is configured to stitch the multiple images into a single image that captures an entirety of the lower surface of the retaining ring.

9. The polishing apparatus of claim 1, wherein the controller is configured to generate an alert to an operator if the controller detects that the retaining ring is damaged.

10. A polishing apparatus, comprising:
    a polishing station;

a carrier head to hold a substrate in contact with a polishing pad at the polishing station, the carrier head including a retaining ring;

a camera positioned to capture an image of a lower surface of the retaining ring when the carrier head moves away from the polishing pad wherein the camera has a field of view that captures an entirety of the lower surface of the retaining ring in a single image; and a controller configured to perform an image processing algorithm on the image to determine whether the lower surface of the retaining ring is damaged.

\* \* \* \* \*